W. R. MILLER.
Drip-Cups for Bottles.
No. 134,302.　　　　　　　　　　Patented Dec. 24, 1872.
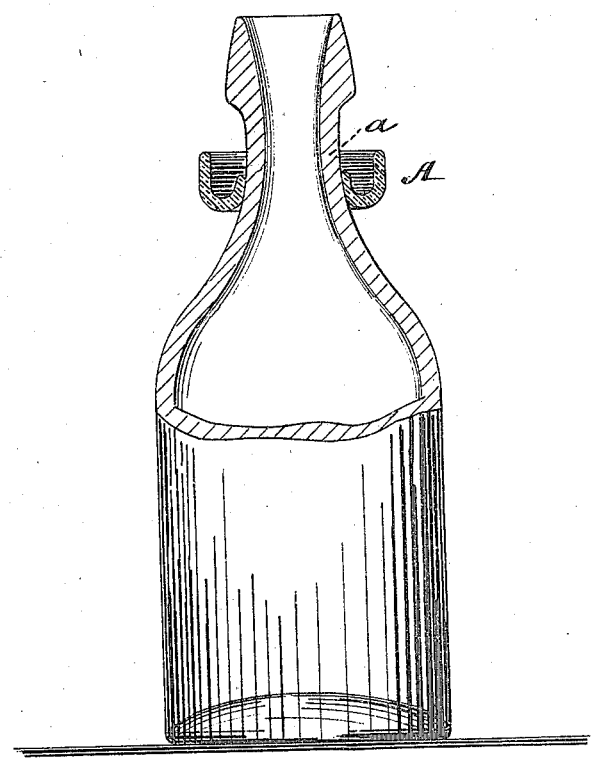

UNITED STATES PATENT OFFICE.

WILLIAM R. MILLER, OF BALTIMORE, MARYLAND.

IMPROVEMENT IN DRIP-CUPS FOR BOTTLES.

Specification forming part of Letters Patent No. 134,302, dated December 24, 1872.

*To all whom it may concern:*

Be it known that I, WILLIAM R. MILLER, of Baltimore, in the county of Baltimore and State of Maryland, have invented an Improvement in the Construction of Drip-Cups for Bottles, of which the following is a specification:

The invention relates to a cup or circular trough applied about the necks of bottles in order to receive the drip or waste liquid which exudes from the mouth and trickles down the side of neck; and consists in forming it separately and of elastic material, so that it may be rendered attachable or detachable, as occasion may require.

The drawing represents a sectional elevation of a drip-cup forming a part of a bottle.

A is the drip-cup, having the central aperture $a$, and made of rubber or some substance having the property of yielding to pressure and reassuming its original shape as soon as the pressure is withdrawn.

The mode of applying the cup is to place it with its aperture about the top of the neck and force it down until it has reached the desired point thereon, when it will firmly compress the neck and secure itself in position. A piece of loosely-woven cord or other absorbent is placed in the cup to retain the liquid. The bottle may be blown with a slight annular rib to form a flange for locating the cup on the neck as well as a firm base against which it may securely rest.

Those who retail or use a succession of bottles may use the same drip-cup for them all, removing it from one bottle as soon as emptied and placing it in a moment upon another which is filled with liquid.

I especially use this device, at present, for the numerous patterns of sauce-bottles in order to save the table-cloth from being stained.

Having thus described my invention, what I claim as new, and desire to secure by Letters Patent, is—

The detachable elastic drip-cup A $a$, adapted for use on bottles, as described.

WM. R. MILLER.

Witnesses:
SOLON C. KEMON,
DURBIN OURAND.